Oct. 8, 1929.                F. J. O'BRIEN                1,730,622
                           FLEXIBLE PIPE SLIP
                          Filed Jan. 20, 1928
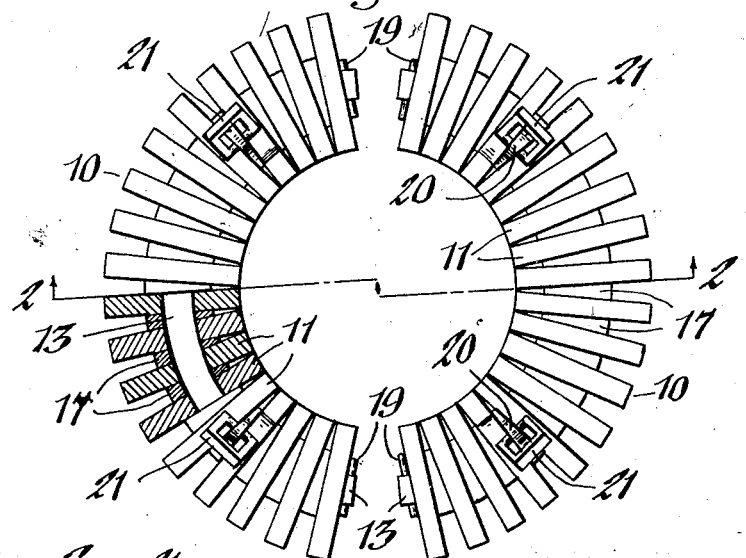
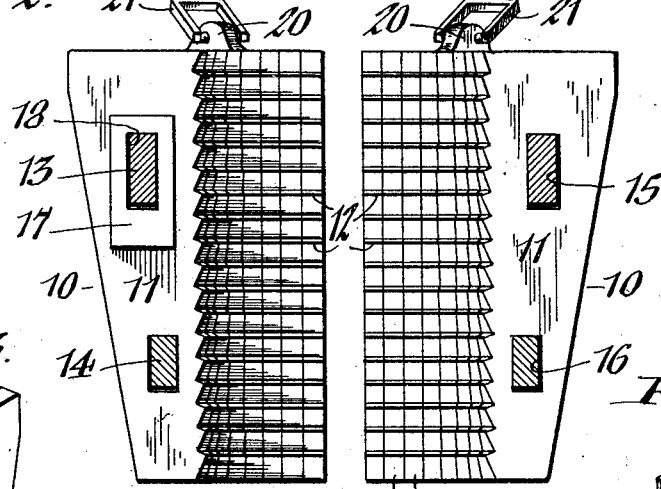
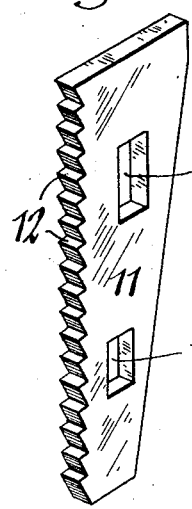
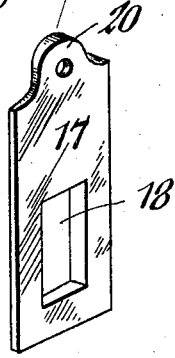
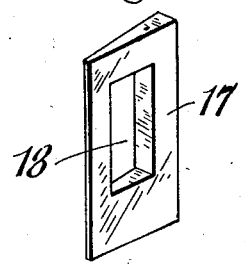
Inventor,
Frederick J. O'Brien,
by Geyer & Geyer
Attorneys.

Patented Oct. 8, 1929

1,730,622

UNITED STATES PATENT OFFICE

FREDERICK J. O'BRIEN, OF TITUSVILLE, PENNSYLVANIA, ASSIGNOR TO STRUTHERS WELLS-TITUSVILLE CORPORATION, OF TITUSVILLE, PENNSYLVANIA, A CORPORATION OF MARYLAND

FLEXIBLE PIPE SLIP

Application filed January 20, 1928. Serial No. 248,133.

This invention relates to improvements in the pipe slips or gripping devices employed in connection with well drilling apparatus.

One of its objects is to provide a flexible pipe slip of this character which, while light in weight and easy to handle, is strong and rugged in construction so as to render it capable of withstanding the hard and rough usage to which such slips are subjected.

Another object of the invention is the provision of a pipe slip which is inexpensive in construction and which is so designed that its gripping sections may be made from flat stock.

In the accompanying drawings:—

Figure 1 is a top plan view, partly in section, of a pipe slip constructed in accordance with my invention. Figure 2 is a transverse vertical section thereof on line 2—2, Figure 1. Figure 3 is a perspective view of one of the gripping members. Figures 4 and 5 are perspective views of the spacer plates.

Similar characters of reference indicate corresponding parts throughout the several views.

My improved slip, as shown in the drawings, preferably consists of two semi-circular units or sections 10, 10 which are adapted for engagement with the tapered opening of the customary table or spider bushing (not shown) of the drilling apparatus, the pipe or casing extending through these slip units and suspended from them in the usual manner.

Each of these slip units consists of a plurality of radially-disposed wedge plates or gripping members 11 whose bearing edges are tapered to conform to the conical opening in the table bushing, while their inner or gripping edges are provided with threads or wickers 12 to prevent the pipe or casing from slipping downwardly relatively thereto. These wedge plates are rectangular in cross-section, being of uniform thickness from their inner to their outer edges and preferably formed from flat stock in any suitable and well known manner. The wedge plates of each slip unit are supported on upper and lower semi-circular rings 13 and 14, respectively, said plates having corresponding ring-receiving openings 15, 16 which are of a size to readily receive the plates and allow them sufficient freedom of movement to enable the slip units to firmly grip the pipe about its entire circumference. These supporting rings also serve to hold the wedge plates against vertical displacement relative to one another.

As shown in Figure 1, the inner or toothed edges 12 of the radial wedge plates 11 are arranged side by side in abutting relation to one another to form a continuous and uninterrupted pipe-engaging surface, while their outer edges are spaced apart. This radial arrangement of the wedge plates is maintained by wedge-shaped spacer plates 17 tapering from their outer to their inner edges and each having an opening 18 therein for receiving the upper ring 13 on which said spacer plates are supported. At their ends the supporting rings 13, 14 of the slip units are provided with cotter keys or pins 19 which hold the wedge plates and spacer plates against circumferential displacement.

For facilitating the handling of the slip units, two of the spacer plates 17 adjacent the ends of each unit are provided with integrally formed ears 20 at their upper ends for receiving suitable handles 21.

I claim as my invention:—

1. A casing slip of the character described, comprising an arcuate supporting member, a plurality of pipe-engaging elements suspended radially from and held against vertical displacement relative to said supporting member, said elements being made from flat stock, and rigid spacing means having inwardly converging side walls disposed between the pipe-engaging elements for maintaining them in a radial position on the supporting member.

2. A casing slip of the character described, comprising an arcuate supporting member, a plurality of pipe-engaging elements disposed radially on said supporting member, said elements being of a uniform thickness from their inner to their outer edges, and spacing members of wedge-shaped cross section arranged on the supporting member between said elements.

3. A casing slip of the character described, comprising an arcuate supporting member, and a plurality of pipe-engaging elements consisting of relatively thin flat plates disposed radially on said supporting member, said plates having openings therein for receiving the supporting member.

4. A casing slip of the character described, comprising an arcuate supporting member, a plurality of pipe-engaging elements consisting of relatively thin, flat plates having openings therein for receiving said supporting member, and spacing plates mounted on the latter between the pipe-engaging elements for maintaining them in their radial position.

5. A casing slip of the character described, comprising an arcuate supporting member, a plurality of pipe-engaging elements consisting of relatively thin, flat plates having openings therein for receiving said supporting member, the inner edges of said elements having wickers thereon, and means mounted on said supporting member and disposed alternately between the pipe-engaging elements for holding the wicker-bearing edges of the latter in juxtaposition to one another to form a continuous pipe-gripping surface.

6. A casing slip of the character described, comprising an arcuate supporting member, a plurality of pipe-engaging elements consisting of relatively thin, flat plates having openings therein for receiving said supporting member, the inner edges of said elements having wickers thereon, and spacer plates mounted on the supporting member between said pipe-engaging elements for maintaining them in their radial position, said spacer plates tapering from their outer to their inner edges for disposing the inner wicker-bearing edges of said elements in juxtaposition to one another and the outer edges thereof in spaced relation to one another.

7. A casing slip of the character described, comprising an arcuate supporting member, a plurality of pipe-engaging elements mounted on said member and consisting of flat plates, and spacer plates arranged on the supporting member between said pipe-engaging elements for maintaining them in a radial position, one or more of said spacer plates terminating in an attaching ear for receiving a handle.

8. A casing slip of the character described, comprising upper and lower arcuate supporting members, a plurality of relatively thin, flat pipe-engaging plates having upper and lower openings therein for receiving the corresponding supporting members, the inner edges of said plates having wickers thereon, and wedge-shaped spacer plates mounted on the upper supporting member between said pipe-engaging plates for maintaining them in a radial position, those spacer plates adjacent to the ends of the supporting member terminating at their upper ends in attaching ears for receiving handles.

FREDERICK J. O'BRIEN.